UNITED STATES PATENT OFFICE.

SAMUEL CABOT, JR., OF BOSTON, MASSACHUSETTS.

ANTISEPTIC COMPOUND.

SPECIFICATION forming part of Letters Patent No. 305,423, dated September 23, 1884.

Application filed April 10, 1884. (No specimens.)

*To all whom it may concern:*

Be it known that I, SAMUEL CABOT, Jr., a citizen of the United States, residing at Boston, in the county of Suffolk and State of Massachusetts, have invented certain new and useful Improvements in the Composition and Process of Making Antiseptics, of which the following is a specification.

This invention is related to certain compositions of matter and their manufacture which are used to check decomposition, to disinfect polluted places, and to kill low forms of animal and vegetable life. My object is to produce such a compound, which, being easy to manufacture, is also efficient and convenient in use and of low price.

To carry out my invention I proceed as follows: I mix together twenty-five parts, by weight, of anhydrous sulphate of soda and seventeen and one-half parts of charcoal. This mixture is heated in a crucible or pot, or in a reverberatory furnace, to a bright-red heat for about an hour. After the mass has cooled sufficiently, it is treated with water and a solution made of all that is soluble, which is then filtered or decanted from any insoluble carbonaceous matter remaining. In this operation, which is well understood, coal and other combustible substances may be used in place of charcoal; but whatever the reducing agent may be it is desirable that more should be present than is required to combine with the oxygen of the sulphate, so that the latter may be perfectly decomposed. The watery solution thus formed, if it be dilute, should now be boiled down to about forty parts, by weight, and to it is added one hundred and fifteen parts of finely-powdered rosin of good quality, which will dissolve in the sodium sulphide previously prepared. In this manner I form a solvent (containing sulphur) for naphthaline and for the heavy oil of tar, and I complete the manufacture of my antiseptic by adding two hundred parts, by weight, of crude naphthaline or of the oil produced in distilling tar, which passes off between 200° and 225° centigrade. This oil contains naphthaline in large quantities; also, cresol and phlorol and other similar bodies, all of which are excellent antiseptics. I should state, however, that to facilitate the solution of naphthaline or naphthaline-oil, before referred to, it is desirable to dilute the sulpho-resinous solvent above described with hot water, the quantity depending upon the consistency which it is wished the finished product shall have.

In the foregoing description of the compound I have invented and the method of making the same I place no special importance upon the way in which (by the aid of carbonaceous matter) the sulphate of soda is converted into sulphide, as there are other well-known ways in which the sulphide may be made; nor, indeed, is it necessary for the manufacture of my antiseptic to begin with sulphate if sulphide is readily obtainable. When that is the case, the original solvent solution for the rosin may be made by dissolving fourteen parts, by weight, of sodium sulphide in twenty-six parts of hot water. Potassic sulphide, and also "liver of sulphur," may be substituted for the sodic sulphide with excellent results, the only objection to the use of such substances being their greater cost; and although I have in the foregoing spoken of rosin as a necessary component of the solvent for the naphthaline and of the oil which may accompany it, still I do not restrict myself to it in practice, as there are other resins and fir-balsams—such as pitch, Burgundy pitch, gum-thus, and notably dammar resin—which are very efficient in combination with the alkaline sulphides. These and similar resins may be used according to circumstances—that is, their abundance and the special use to which the antiseptic is to be put, whether for nice or common purposes.

My invention will be found to possess powerful antiseptic properties and to be very serviceable as an insecticide, on account of the carbo-hydrogens and sulphur it contains in intimate association with each other. It may be used either in solution or dry in the form of powder. It is well adapted for preserving timbers used in building, for disinfecting cellars and vaults, for destroying insects and worms which infest certain plants, and as a wash for animals suffering from parasites, and for many similar uses.

Having thus described my invention and the manner in which the same is carried out, what I claim, and desire to secure by Letters Patent, is—

1. The herein-described antiseptic, disinfecting, and insecticide compound, consisting of resin dissolved in a solution of an alkaline sulphide, holding in solution crude naphthaline, substantially as described.

2. The herein-described process of forming antiseptic compounds, which consists in dissolving resin in a solution of alkaline sulphide and adding thereto crude naphthaline, or the distillate obtained by heating the heavy products of distillation of coal-tar between 200° and 225° centigrade, substantially as described.

In testimony whereof I have affixed my signature in presence of two witnesses.

SAMUEL CABOT, JR.

Witnesses:
   FRED OBERHAUSER,
   ARCHIBALD M. HOWE.